2 Sheets—Sheet 1.
A. PONSARD,
Assignor to W. SELLERS.
APPARATUS FOR GENERATING GASEOUS FUEL.
No. 9,924. Reissued Nov. 8, 1881.
— Fig. 1. —
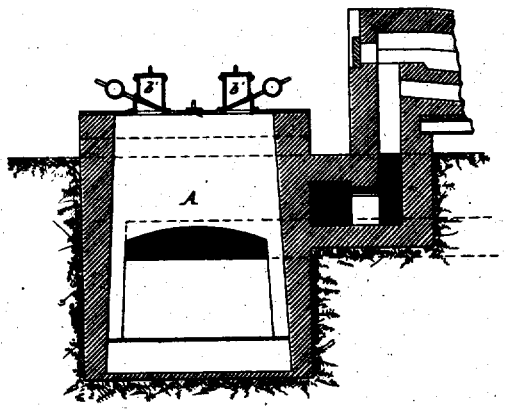
— Fig. 2. —
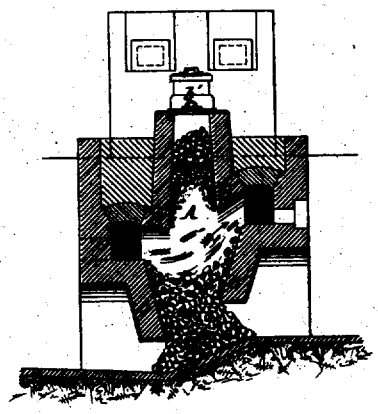
— Fig. 3. —
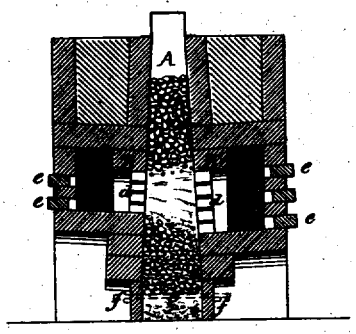
— Fig. 4. —
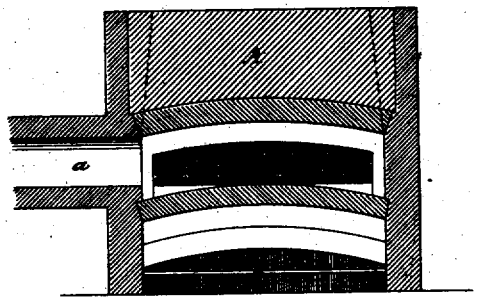
Witnesses:
J. Walter Douglass
J. Thornden Bell.
Inventor:
A. Ponsard.
by Henry Baldwin Jr.
Atty.
THE NORRIS PETERS CO., WASHINGTON, D. C.

2 Sheets—Sheet 2.
A. PONSARD,
Assignor to W. SELLERS.
APPARATUS FOR GENERATING GASEOUS FUEL.
No. 9,924. Reissued Nov. 8, 1881.
— Fig. 9. —
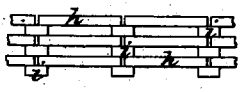
— Fig. 5. —
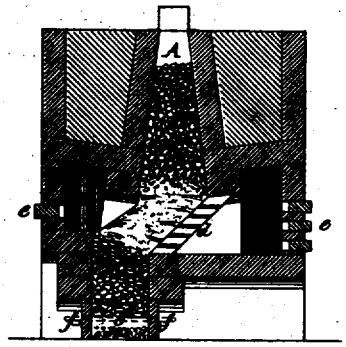
— Fig. 6. —
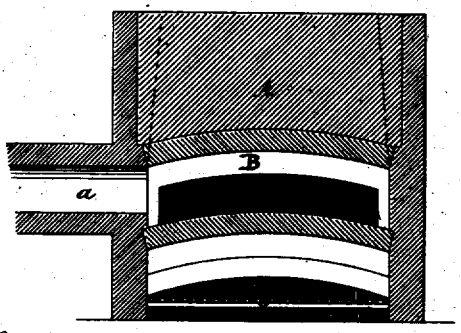
— Fig. 10. —
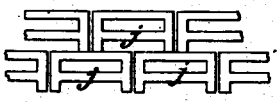
— Fig. 7. —
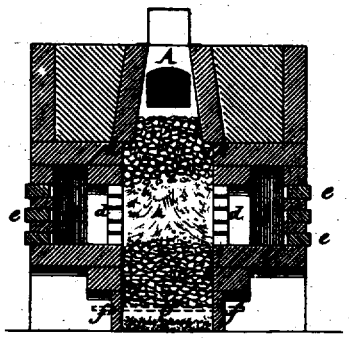
— Fig. 8. —
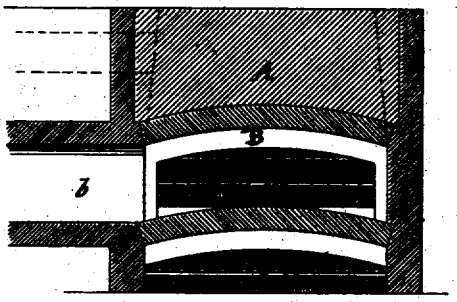
*Witnesses:*
J. Walter Douglass
J. Snowden Bell.
*Inventor:*
A. Ponsard.
by Henry Baldwin Jr.
Atty.
THE NORRIS PETERS CO., WASHINGTON, D. C.

UNITED STATES PATENT OFFICE.

AUGUSTE PONSARD, OF PARIS, FRANCE, ASSIGNOR TO WILLIAM SELLERS, OF PHILADELPHIA, PENNSYLVANIA.

APPARATUS FOR GENERATING GASEOUS FUEL.

SPECIFICATION forming part of Reissued Letters Patent No. 9,924, dated November 8, 1881.

Original No. 163,247, dated May 11, 1875. Application for reissue filed December 4, 1878.

DIVISION B.

*To all whom it may concern:*

Be it known that I, AUGUSTE PONSARD, of the city of Paris, in the Republic of France, have invented certain new and useful Improvements in Apparatus for Generating Gaseous Fuel, of which improvements the following is a specification.

It is the object of my invention to deliver the gaseous product at the highest temperature, and to supply the air which supports the combustion of the fuel in the producer in such manner as to compel it to pass through and not around the fuel; and to these ends my invention consists in so constructing the gas-producer that the fuel is supported upon a hearth or grate, the air is supplied above the hearth or grate, the gaseous product is delivered also above the hearth or grate, the relative position of the supply and the delivery defining the traverse of the air and of the gas through a section of the producer, which thereby becomes the hottest; and it further consists in making the fuel-chamber wider th n the air-inlet. I contemplate varying under varying circumst nces the construction of the producer, with the view in all cases to admit the air above the hearth or grate, to define its traverse through the fuel, and to carry off the carbonic oxide from that section of the producer where this gas is the hottest; and I have shown examples of my improved gas-producers in the accompanying drawings, which form part of this specification, and in which—

Figure 1 represents a vertical longitudinal section through the producer and a portion of a furnace in connection therewith. Fig. 2 represents a vertical transverse section near the center of the producer and an end view of the furnace, shown partially in section in Fig. 1. Fig. 3 represents a vertical transverse section near the center of a producer, the details of which are varied from that shown in Figs. 1 and 2. Fig. 4 represents a vertical longitudinal section through the center of the producer shown in Fig. 3. Fig. 5 represents a vertical transverse section of a further modification of the producer. Fig. 6 represents a vertical longitudinal section through the center of the producer shown in Fig. 5. Fig. 7 represents a vertical transverse section of another modification of the producer. Fig. 8 represents a vertical longitudinal section through the center of the producer shown in Fig. 7. Figs. 9 and 10 represent diverse arrangements of grating used in connection with some forms of my producers.

In the disposition represented in Figs. 1 and 2, the gas-producer consists of a vertical chamber, A, (which is charged with fuel by means of two ordinary valve-boxes, *b'*,) the lower portion of which presents openings upon opposite sides, by means of which cinder and ashes may be removed. To this end the lower portion of the space A terminates in two inclined planes, *c c'*, extending down to a certain distance above the hearth, in such manner that raking-bars may be easily inserted into the openings thus provided, to loosen and remove the ashes and cinders accumulating in this portion of the producer. Above the two inclined planes *c c'* the upper interior side walls of the producer are supported upon arches B B', which extend nearly the length of the producer. Air is admitted to the under side of the arch B through the conduit *a*, and the under side of this arch will define the height at which the air can have access to the fuel. The gas is taken off under the opposite arch, B', and from thence through the conduit *b* to the place of combustion, and the under side of this arch will define the height at which the gas can leave the fuel. The relative heights of the two arches B and B' will therefore define the traverse of the air and gas through the fuel and compel the gas to pass off from the hottest part of the producer. The relative position of these two arches in this producer is such that the air and the gas generated will traverse the fuel in a slightly-ascending plane. The arch B is made shorter than the producer, so that the fuel-chamber will be wider than the air-inlet. Into the offsets thus formed at the air-inlet the fuel will slide and extend beyond the ends of the arch B, so that the air, as it passes from under this arch, will enter and pass through the fuel and be prevented from following the walls of the inclosure, and so passing around the fuel.

Figs. 3 and 4 represent a gas-producer, A, which from the top to its base presents the form of a frustum of a pyramid. This is varied in width according to the nature of the combustible employed. In this disposition the conduit *b* of the outgoing gas is placed at the same height with, or even a little lower than, the conduit *a*, which supplies the air. The under sides of the two arches B and B′ are at the same height, but the opening under the outlet-arch B′ is the deepest, so that the area of the gas-outlet shall be greater than that of the air-inlet. The arch B, for the admission of air, is, as before described, shorter than the producer, so as to compel the air to pass through the fuel, and the openings under both arches are fitted with a grating, *d*, forming a part of the inclosure of the space A. This grating is constructed of refractory pieces, (as bricks,) the shape of which may vary, while they are so disposed as to leave sufficient sectional area for the air and gas. These bricks are simply built up without the interposition of any mortar, so that they may be easily replaced (when deteriorated) through the openings *e*, provided in the two parallel long sides of the producer. The lower part of the apparatus is closed by loose walls *f*, which are withdrawn to remove the ashes produced by combustion; or it may remain open if the pressure of the air entering the producer is not great enough to force back the gas through this part of the apparatus. To prevent the loss of gas which might result from its driving back when the air is supplied under pressure, or the indraft of air when the air is supplied by natural draft, these loose walls *f f* should be luted up with ashes, earth, or sand. To facilitate cleaning, I provide a grate, *g*, composed of loose bars, a short distance above the hearth, upon which grate the fuel rests. The removal of a few bars will allow the cinders which accumulate in this part of the producer to fall.

Figs. 5 and 6 represent a producer in which only the orifice *b* for the outlet of gas is closed by a grating, *d*, disposed in steps. The other side, where the air is admitted, is inclined, and if a similar inclination is given to the grating, the layer of coal traversed by the air is about equal at all points. The arch B for the admission of air is, as before described, shorter than the producer, so as to compel all the air to pass through the fuel, and the opening for the gas-outlet is, as before, greater than that for the air-inlet.

Figs. 7 and 8 represent a producer in which the air enters the producer from above, and the gas may go out through one side or both sides of the apparatus. The drawings represent two outlets, *b*, and I have also increased the width of this part of the chamber, so that the layer of fuel traversed by the air may be as uniform as possible. It will also be observed that I provide in the masonry offsets *k* between the air-inlet and the gas-outlet, so that the fuel-chamber shall be wider than the air-inlet, as in the other forms of producers before described. Into these offsets the fuel will slide, so as to prevent the air entering by the conduit *a* from following the inclosure of space A and compel it to traverse the fuel before reaching the outlets *b* for the gas.

Figs. 9 and 10 represent diverse arrangements of the gratings *d*, designed to prevent the coal from falling out laterally into the passages *a* and *b* for the inlet of air and the outlet of gas. In Fig. 9 the grating is formed of thin bricks *h*, laid flat upon bearers *i*, leaving passages between these shallow enough to prevent the coal from sliding outward. In Fig. 10 the grating is formed of hollow bricks *j*, arranged in quincunx, or simply superposed, so as to leave numerous passages for the air and gas, while they prevent the coal from obstructing the passages *a* and *b*. It is evident that the forms and dispositions of these pieces of refractory clay may be greatly varied without inconvenience, providing they are arranged to be easily withdrawn and replaced through the openings *e* when they become injured from use.

Having thus described my invention, what I claim as new, and desire to secure by Letters Patent, is—

A gas-producing chamber provided with a hearth or grate, upon which the fuel rests, an air-inlet above the hearth or grate, a gas-outlet also above the hearth or grate, and offsets between the air-inlet and the gas-outlet, substantially as and for the purposes described.

AU. PONSARD.

Witnesses:

ROBT. M. HOOPER,

A. GALLAIR.